United States Patent Office 3,390,980
Patented July 2, 1968

3,390,980
METHOD OF PRODUCING BERYLLIUM HALIDES FROM BERYLLIUM ORE IN A HIGH INTENSITY ORE
Harry K. Orbach, Corona Del Mar, Jacob G. Bedjai, Torrance, and Richard E. Martindill, Huntington Beach, Calif., and Jerome Kritchevsky, Chicago, Ill., assignors to MHD Research, Inc., Newport Beach, Calif., a corporation of California, and MEGA Metals Corporation, Chicago, Ill., a corporation of Illinois
Filed Jan. 20, 1964, Ser. No. 338,792
10 Claims. (Cl. 75—84.5)

This invention has to do with the production of beryllium halide or metallic beryllium, and particularly by methods and apparatus whereby the beryllium source undergoes halogenation in the atmosphere of an arc within a plasma jet-type reactor.

First as to the beryllium source, the metal naturally exists essentially in the form of its oxide, BeO as such, or combined or complexed with either or both alumina or silica, as in beryl ore, constituted as $3BeO-Al_2O_3-6SiO_2$. Whether and however combined with other metallic oxides, the beryllium source for purposes of the present invention is regarded as being essentially beryllium oxide, since its convertibility to the halide under the conditions later described will occur regardless of the presence of other metallic oxides. Where the latter are present, the invention contemplates provision, if desired, for their conversion to and recovery as metallic halides.

The invention is predicated upon reacting beryllium oxide with chlorine or fluorine in an atmosphere of a high intensity, non-consumable electrode type of reactor known as a plasma jet, for the ultimate production of beryllium chloride or fluoride, which later may then be converted to metallic beryllium. It has been found that chlorine and fluorine are effectively combinable with beryllium in the arc atmosphere to produce beryllium chloride or beryllium fluoride. The resulting beryllium chloride may be reduced as by reaction with sodium or by known electrolytic methods to produce metallic beryllium. The beryllium fluoride may be reduced with magnesium to produce metallic beryllium.

Heretofore it has been proposed to produce beryllium chloride by procedures requiring somewhat involved preparation of a charge mixture fed to a non-arc reaction zone wherein the conversion occurs at relatively low temperatures, e.g. 500 to 1100° C., over long reaction times or to react them in arcs operating in the low intensity ranges to prevent excessive electrode consumption. The present invention departs from and substantially improves upon such conventional practices by utilizing a system which does not require involved charge preparation and which employs a high intensity arc device which is capable of providing such high reaction temperatures, generally in the range of 2,000 to 10,000° C., that reaction times of milliseconds are sufficient for high conversions.

Further in this respect, the invention contemplates new designs and modes of plasma jet operations capable of accepting and operating for long periods on corrosive gases without appreciable consumption of electrodes so that the necessity for continuously feeding electrodes into the device is eliminated.

For purposes of the arc atmosphere reaction, involving as it does the release of oxygen, we include, in the reactant feed, a suitable carbon source for combination with the oxygen present, thus chemically isolating the oxygen from the essential halogenation reaction. The invention contemplates broadly the use of any suitable carbonaceous material as the source of carbon, although most usually it is preferable to use carbon powder. As an illustrative alternative, applying to the source of both carbon and halogen, the latter may be combined in such forms as tetrachlorethylene or carbon tetrachloride, with which the beryllium oxide may be slurried. As will be understood, the carbon an halogen, whether supplied as such or in combined form to the conversion zone, chemically react as carbon and halogen with the beryllium oxide in the arc atmosphere.

A further feature, applying to the arc maintenance and the avoidance of serious equipment corrosion, is the provision made for feeding to the reactor an inert gas such as nitrogen, in such relation to the reactor anode and cathode as to permit the formation of a high temperature arc atmosphere into which the corrosive feed may be introduced and maintained beyond the cathode terminal, all as will later appear.

The invention contemplates various additional features and objects, all of which together with the details of an illustrative embodiment will be fully understood from the following description of the accompanying drawings in which:

FIG. 1 is a showing in flow sheet form of certain stages of the process;
FIG. 2 is a continuance illustrative of the remaining stages beyond the right of FIG. 1;
FIG. 3 is a sectional showing of the reactor.

While, as previously indicated, the invention is applicable to the use of either chlorine or fluorine for halogenation of the beryllium, for purposes of description, chlorine hereinafter will be referred to as the halogenating reactant.

The various materials and power requirements utilized in the system may be derived from any of various suitable sources. Merely for purposes of illustration, we have indicated diagrammatically at 10 through 16 sources for cooling or heat exchange liquids, power supply, chlorine and inert gases, according to the drawing designations.

The system will first be described in flow sheet relation to the reactor generally indicated at 17, and later described in detail. For present purposes, it will suffice to characterize the reactor as being one or more plasma jet units designed to receive the various feed streams into a high temperature electric arc atmosphere, the effluent from which is discharged into an enlarged cooling or quenching chamber 18.

Powdered beryllium oxide or beryl is fed from hopper 19 through conduit 20 to be mixed at 21 with carbon being supplied from hopper 22 through grinder 23, separator 24 and conduit 25, both powders desirably being smaller than 325 mesh for good conversions. The mixture is taken through conveyor system 26–27 to hopper 28 from which the mixture is supplied at proper rate as regulated by a suitable control device 29 to a mixer 30 receiving chlorine at a rate controlled by regulator 31 from a supply line 32. The resulting mixture is discharged by a suitable displacement device 33 through line 34 to the reactor 17.

A gas such as argon may be fed through line 35 to the reactor for purposes of starting the electric arc, following which argon is replaced by continuous feed of nitrogen through line 36. Water to cool the later described electrodes and quench chamber 18, is supplied through line 37 from source 13, to which return circulation occurs through lines 38. DC power is supplied from source 11 to the reactor 17 through the circuit 39. The power supply may have an associated high frequency starter 40, as an illustrative means for starting the reactor arc.

The reaction mixture, comprising mainly gaseous chlorides, unreacted oxide, carbon, carbon monoxide, chlorine and other minor gases, is discharged into chamber 18 wherein the mixture is cooled to between about 400 and 500° C. by circulation of water or other cooling fluid from line 37 to line 38 through the chamber jacket 41. The solids, essentially carbon and unreacted oxide, are withdrawn through line 42 to separator 43. Solids entrained in the gaseous chamber effluent leaving through line 44, are separated in cyclones 45 and 46 to be discharged through lines 47 and 48 to the collector 43. The solids mixture thence may be taken through line 49 to be reground in grinder 50, screened in stages 51, 52 and 53, thence to be sent to hopper 54 for recycling to the reactor through the previously described conveyor system.

Hot gases from the separator 46 pass through line 55 to one or more condensers 56 which may be of any suitable type capable of lowering the gas temperature to between about 200° and 250° C. at which temperature the beryllium chloride condenses out as a solid. Merely as illustrative, the condensers 56 are shown diagrammatically to have tubular configurations surrounded by jackets 57 through which a suitable high boiling cooling liquid, such as "Dowtherm," is circulated from source 12 through lines 60–61 and returned through line 62. The effluent from condensers 56 passes through lines 63 into cyclones 64 which operate to separate the solid beryllium chloride for passage through lines 65 into holding vessel 66 which may be maintained by a suitable heater 67 at about 400° C. to melt and keep the beryllium chloride in liquid state. Gases and uncondensed beryllium chloride pass from separators 64 through lines 68 and one or more bag-type filters 69 from which separated residual beryllium chloride is taken through lines 70 and 71 to the holding vessel 66. The cyclone separator 64 as well as filter 69 may be temperature controlled to maintain the vapor or gas temperature within the 200° to 250° C. range, as by providing the cyclones and the filters with jackets 72, through which the exchange liquid is circulated from line 61 through lines 73, 74, 75, 76 and 77, to be returned to the supply source through line 62.

In cases where recoverable amounts of aluminum and/or silicon chloride are present, the hot gases from the bag filters 69 are further cooled by passage through line 78 (FIG. 2) to one or more condensers 79, again shown diagrammatically as tubes 80 surrounded by jackets 81 through which cooling water is circulated from lines 82–83 to be returned to the supply source through lines 84–85. Being cooled to between 25° and 100° C. in condensers 79, the gases pass by way of lines 86 through cyclone separators 87 from which solid aluminum chloride is taken through lines 88 to receiver 89. The gases and residual or entrained aluminum chloride pass from the separators 87 through lines 891 into bag filters 90 which separate any remaining aluminum chloride for removal through lines 91–92 to vessel 89. The cyclones 87 and bag filters 90 may also be jacketed, as illustrated, and cooled by water taken from line 82 through lines 93, 94, 95, 96 and 97 and delivered to the return line 85.

Gases from filters 90 pass through lines 98 and exchanger 99 to coil 100 and thence to a connected receiver 101. The coil, or equivalent, may be suitably cooled to reduce the gas temperature within the range of about 0° to −70° C., as by accommodating the coil and receiver within a vessel 102 through which a suitable refrigerant is circulated by way of lines 103 and 104 from and to a refrigeration plant or unit diagrammatically indicated at 105. The gas is thus lowered to a temperature at which silicon chloride is condensed for removal through line 106. Uncondensed gases leave the receiver through line 107 to be heat exchanged with the line 98 gas stream flowing through exchanger 99, the gases thence being taken for further disposal through line 107, as to a final scrubbing stage generally indicated at 108. The latter typically may comprise a scrubbing column 109 through which the gas flows upwardly in contact with water continuously cycled by pump 110 through lines 111 and 112. Leaving scrubber 109, the gases may be passed through line 113 to a second scrubber 114 in contact with caustic solution being circulated by pump 115 through lines 116 and 117. The scrubbed gaseous residue, composed for the most part of carbon monoxide and nitrogen, is discharged to the atmosphere or other disposal through line 118.

Where no consequential amounts of aluminum or silicon chlorides are present in the gas from bag filter 69, the line 78 gas may be taken directly through line 119 to the scrubbing system 108.

As an illustrative system for the recovery of metallic beryllium, the liquid beryllium chloride is taken from vessel 66 through line 120 to a suitable vaporizer 121 shown diagrammatically to have a bottom heater 122 and to contain a coil 123 to which nitrogen is supplied through line 124. In passing through the coil, the nitrogen is preheated by the vaporizer atmosphere temperature and is discharged into the vaporizer as a carrier by beryllium chloride vapor through line 125 to the reactor 126. Liquid sodium taken by pump 128 from supply 129 is discharged through line 130 into vessel 131 having a bottom heater 132 and containing coil 133 wherein nitrogen taken from line 124 through line 134 is preheated to be discharged into the vessel as a carrier for sodium vapor, the mixture going through line 135 into the reactor 126. The temperature in vaporizer 121 may range between about 450° and 500° C., and in vessel 131 between about 800° and 900° C. The preferred ratio of reactants in vessel 126 is about 4 moles of sodium to 1 mole of beryllium chloride. The reactor effluent passes through line 137 to separator 138 which is maintained at a sufficiently high temperature, about 800° C., so that beryllium metal and sodium chloride collect therein as solids which are sent through line 139 to either of the on stream vessels 140. Sodium vapor leaving the separator 138 through line 141 is condensed in cooler 142 and the condensate is returned through line 143 to the supply source 129. The beryllium metal and sodium chloride collecting alternately in vessels 140 are washed with ammonium carbonate solution introduced through lines 144, and following this the washed beryllium powder is removed through line 145, the liquid salt solution being separated through line 143.

Speaking generally of the equipment to be used in the system, it is desirable, because of corrosion problems, to fabricate the equipment, excepting the plasma jet reactor, from an appropriately resistive metal such as nickel. In addition, any parts or components of the system wherein the temperatures are above about 200° C. may be lined with graphite or carbon to assure adequate protection.

Referring now to FIG. 3, the reactor 17 is shown generally to comprise cathode and anode sections 146 and 147, the former comprising a tubular body 148 of electrically insulative material containing a lower reduced bore 149, intermediate counterbore 150, and an enlarged upper counterbore 151 containing a conductive sleeve 152 held against removal by retainer plate 153. The internal cathode 154 is threaded at 155 within the sleeve 152 for axial adjustment of its later described tip and, relative to the anode, by rotation of the head or handle 156. Direct current is supplied to the cathode by conductor 157 which is the terminal of one of the leads 39. The cathode rod is internally chambered at 158 and 159 for accommodation of an open end circulation tube 160, the function of which will later appear. The lower portion of body 148 contains a passage 161 to which the line 36 arc stabilizer gas is fed into an annular passage 162, from which the gas flows from a mating passage 163 in distributor ring 164 through circularly distributed passages 165 which direct the gas downwardly and inwardly into an annular convergent passage 166 about the cathode tip. The tip structure includes a replaceable tapered tip piece 1661 containing a heat insert 167 which constitutes the tip proper and may be of appropriate metallic composition such as tungsten.

The anode assembly 147, secured to the insulative cathode body by screws 168, comprises conductive body sections 169 and 170, the latter containing a split ring 171 received within and spaced at 172 and 173 from an annular copper electrode 174 having the top and bottom illustrated flange configurations 175 and 178 between which the electrode is downwardly convergent at 179 to form a tapered continuance of surface 180 thus to give the passage 166 downwardly reducing or tapered configuration continuing past the tip 167 into the electrode throat 181.

Below the electrode 179 the anode section 170 enlarges to provide an arc chamber 182 which may be peripherally defined by a conductive metal lining 183 and at its upper end by a graphite liner 184 the surface 185 of which has downwardly flaring enlargement from the throat 181.

The reactor is shown to be internally cooled by the introduction of water from line 37 through inlet 186 from which the water flows upwardly through a spiral passage 187 formed by a thread-like continuing recess in the body section 170 about the metal liner 183, thus to externally cool the latter. Leaving passage 187 the water courses upwardly through passage 1881 into and through spaces 172 and 173 about the copper electrode 179, thence entering annular space 190 from which the water flows through passage 191 into space 192 surrounding the cathode rod 154. The water thence enters chambers 158 and 159 through ports 1921 to internally cool the cathode rod down to a location within the tip piece 1661, from which the water reversely enters the tube 160 and flows upwardly and through into ports 193 and passage 194 to be discharged through outlet 195 communicating with the return waterline 38.

In operation of the reactor, the arc stabilizer gas introduced through inlet 161 and plenum chamber 162–163 is given a swirling motion in being discharged through holes 165 into passage 166. To accentuate the swirling motion, the holes 165 may be drilled at corresponding angularities from their illustrated radial planes. As the gas flows downward through passage 166, the swirling motion creates a vortex in the throat regions about the tip 167 which tends to stabilize the arc along the axis of the system and thus prevent the plasma formed by the arc from eroding the throat walls. The arc created by the potential established by the DC connection 157 and connection 196 with the anode body, extends downwardly from the tip of the cathode adjacent to or along the flaring surfaces of the graphite insert of 184, and downwardly to the region of the upper wall surface of the liner 183, creating a high energy density region generally indicated by the dotted lines. Both electrodes are kept cool by being in contact with rapidly flowing cooling water. Very little wear is observable in ten or more hours of operation.

A feed mixture comprising essentially beryllium oxide, carbon and chlorine gas is introduced through one or more inlets 197 communicating through passages 198 with the interior of the graphite insert 184, the beryllium oxide and carbon in finely divided form thus being carried penumatically by the chlorine gas into the high energy density arc region. It should be particularly noted that these reactants pass through the arc which spreads from the tip of the cathode 167 to reach numerous contact points along the inner walls of insert 185 and the reaction space 182. The conversion reactions occur at extremely high rates within the chamber 182, the effluent from which discharges downwardly into the quench chamber 18.

During operation the power level and energy density may be varied independently by increasing the current passed through the system, by varying the feed rates of the stabilizer gas and feed mixture, and, at constant current, by varying the gap between the cathode and anode to vary the voltage.

Anode insert 184 is preferably made of graphite and kept in close contact with the water-cooled wall 178 to decrease the attack of the extremely hot and partially dissociated chlorine on the metal walls of the anode 179. Since the arc stabilizer gases passing the hot tip of the cathode are inert and are traveling downward at high velocity, no chlorine reaches the metal parts of the cathode. By the use of these two means, the life time of the equipment, even when operating with very reactive chemicals, is increased to a satisfactory length even when operating in the high intensity mode.

Typical examples of operation, applying particularly to the reactor and recoverable yields, are given in the following:

Example 1.—Beryllium from BeO

A mixture of 68 weight percent BeO concentrate (95 weight percent BeO) and 32 weight percent petroleum coke was used as feed. The rates and power were as follows:

Feed rate _____lbs./hr__ 7.24
Chlorine rate _____lbs./hr__ 12.7
Nitrogen rate _____s.c.f.h__ 220
Power _____kw.-DC__ 57.6
Energy density _____watts/cm.$^3$__ 1500

A total of 20.5 pounds of mixture was fed in 170.5 minutes and 20.28 pounds of solid product $BeCl_2$ and 7.8 pounds of unreacted material were collected in separate parts of the system.

The product contained 98% $BeCl_2$ and 2% unreacted material. Apart from the unreacted material, a spectrographic analysis of the chloride indicated no more than 0.1% total impurities.

The conversion to beryllium chloride was 62.6% for the single pass and the energy consumption was 52.5 kw.h./lb. of contained beryllium metal.

The beryllium chloride produced was reduced with sodium in vapor phase under the following conditions:

$BeCl_2$ feed rate—7.21 lbs./hr. carried with 32.4 s.c.f.h. of nitrogen (or other inert gas such as argon).

Sodium feed rate—8.29 lbs./hr. carried with 129.6 s.c.f.h. of nitrogen (or other inert gas such as argon).

Half of the sodium was recovered and recirculated; 0.811 lbs./hr. of beryllium metal was produced.

Example 2

As a demonstration of the effect of energy density on yield at these rates of throughput the same conditions as Example 1 were used except that the power was reduced to lower the energy density to 950 watts per cubic centimeter and the conversion to chloride dropped to 24.2 percent per single pass.

Example 3

A mixture of 70 weight percent calcined beryl ore (11 weight percent BeO) and 30 weight percent petroleum coke was used as feed.

Rates and power were as follows:

Feed rate _____lbs./hr__ 8
Chlorine _____lbs./hr__ 14
Nitrogen rate _____s.c.f.h__ 200
Power _____kw.-DC__ 55
Energy density _____watts/cm.$^3$__ 1400

16 pounds of mixture was fed in 2 hours and the following amounts of products were collected:

$BeCl_2$ _____ 2.5
$AlCl_3$ _____ 2
$SiCl_4$ _____ 10.5 indicating a 66% conversion.

The beryllium chloride was reduced under conditions shown in Example 1.

Having described the non-consumable electrode, plasma jet kind of reactor required for our purposes, is is appropriate that we distinguish this type from others employed or proposed.

Arc reactors have been proposed before for carrying out chlorination reactions, but the apparatus used has always been of the consumable electrode type in which there is a relatively low upper limit to the amount of energy that can be delivered to a given amount of reactants passing through the arc. This limit in the conventional type of reactor is the point at which the current density on the electrodes, and therefore the energy flux to the electrodes, is so great that the only way energy may be dissipated is by vaporization of the electrode material itself. This results in a high erosion rate of the electrodes with attendant economic detriment. Consequently, although higher arc intensities are desired to increase the throughput for a given reactor, or to attain high temperatures necessary for more favorable yields, most arcs are operated somewhat below the upper limit of the low intensity range. One attempt to avoid this limit has been made by constructing the anode, the electrode most severely eroded, out of a mixture of the reactants and depending upon the vaporization of this electrode at a high rate to provide throughput of material for the process. However, it has been found impossible practically to continuously fabricate electrodes of the proper stoichiometric proportions in the required mechanical shape and have them be sufficiently conducting to carry the arc current.

In the reactor employed for the present process, we have avoided these difficulties by employing a non-consumable arc of the type known variously as a plasma jet, a wall-stabilized arc, a gas-stabilized arc or a blown arc. In all of these the anode is a hollow tube that is cooled externally and has a gas passing at high velocity through it, forcing the arc to move rapidly over the inner surface. By these means the current may be increased far beyond the low intensity limit without vaporization or any appreciable wear on the electrodes, and the materials passing through the anode raised to much higher temperatures. Since the walls are cooled there is a cold boundary layer of gas next to the inner walls. This cool layer serves to protect the walls against the corrosive action of chemicals and confine the arc discharge to a hot central region which is at an even higher enthalpy level than the average calculated value. In this central region are contained dissociated gaseous species which greatly aid the rate of reaction both by raising gaseous reactants to high energy levels and by transference of heat to solids through surface recombination of dissociated species.

The distinction between low and high intensity arcs is usually related in terms of current density of the stationary spot where the arc attaches at the anode (or positive electrode), 100–200 amps per square centimeter being the range of the high intensity and 30–75 the range of the lower intensity. With the type of arc reactor contemplated herein, this quantitative distinction loses significance since the anode arc spot does not remain stationary, but moves rapidly over the electrode surface. It might be said that it operates in what would be the high intensity mode if the arc did remain stationary, but does so without the rapid erosion that would occur in such a case.

It is clear from the foregoing that the present reactor is different in kind from those in which similar reactions have previously been conducted, and that a comparison on the basis of current density cannot be made. The advantage that is obtained in the present reactor is a higher "energy density", defined as the rate of energy delivery per unit volume, in the entire reaction chamber. We can obtain values of from 14,000 watts per cubic centimeter and higher down to 500 watts per cubic centimeter. Good yields may be obtained at high throughputs for the reaction under consideration at 500 to 10,000 watts per cubic centimeter at the 50–100 k.v. level. At the same level the energy densities obtainable in normal reactors consisting of a chamber into which two or more electrodes protrude generally cannot be greater than 400 watts per cubic centimeter and are usually an order of magnitude lower than this.

We claim:

1. The process that includes flowing an arc stabilizer inert gas stream between spaced non-consumable electrodes and through a reduced passage discharging into an enlarged reaction chamber, maintaining at the discharge end of said passage and in the chamber an electric arc, introducing to the arc atmosphere beryllium essentially in the form of its oxide, also carbon source material and a halogen of the group consisting of chlorine and fluorine, and thereby reacting beryllium and the halogen to form beryllium halide said arc having an energy density at least as high as about 500 watts per cubic centimeter and providing an arc reaction temperature between about 2000° C. and 10,000° C.

2. The process of claim 1, in which the beryllium oxide, halide and carbon source material are introduced to the arc at a location beyond the discharge end of said passage.

3. The process of claim 1, in which the halogen is chlorine and the reaction product is beryllium chloride.

4. The process of claim 1, in which unreacted beryllium oxide removed from said chamber is recycled to the arc atmosphere.

5. The process of claim 1, in which vapor and gaseous effluent from the arc atmosphere are removed from said reaction chamber and further cooled in a substantially larger cooling chamber to condense and recover the beryllium chloride.

6. The process of claim 5, in which the arc atmosphere effluent is cooled in said cooling chamber to a temperature between about 400° C. and 500° C.

7. The process of claim 1, including the further step of reacting the beryllium chloride with vaporous sodium to produce finely divided metallic beryllium powder.

8. The process of claim 1, in which the arc confine progressively enlarges beyond said passage within said reaction chamber, and in which said oxide, chlorine and carbon source material are fed into the location of said progressively enlarging confinement of the arc.

9. The process of claim 1, in which the beryllium oxide is combined with aluminum and silicon oxides which are converted along with the beryllium to their chlorides, and in which the resulting aluminum chloride and silicon chloride are recovered from the reaction chamber.

10. The process of claim 1, wherein the carbon and chlorine are combined in a chlorocarbon compound.

References Cited

UNITED STATES PATENTS

| | | | |
|---|---|---|---|
| 3,077,108 | 2/1963 | Gage et al. | 73—147 |
| 3,332,870 | 7/1967 | Orbach et al. | 204—323 |
| 2,870,007 | 1/1959 | Boettcher et al. | 75—84.5 |
| 2,956,862 | 10/1960 | Schott et al. | 75—84.5 |
| 3,012,954 | 12/1961 | Fahnoe | 204—164 |
| 3,051,639 | 8/1962 | Anderson | 204—171 |
| 3,077,108 | 2/1963 | Gage et al. | 73—147 |
| 3,254,958 | 6/1966 | Margiloff | 204—323 |
| 2,616,843 | 11/1952 | Sheer et al. | 204—164 |
| 3,004,137 | 10/1961 | Karlovitz | 204—164 |
| 3,084,037 | 4/1963 | Smith | 204—164 |

ROBERT K. MIHALEK, *Primary Examiner.*

JOHN H. MACK, *Examiner.*